United States Patent
Aguilar (10) Patent No.: US 8,525,781 B2
(45) Date of Patent: Sep. 3, 2013

(54) HANDHELD PORTABLE POINTING APPARATUS

(75) Inventor: Jim Ray Marentes Aguilar, Albuquerque, NM (US)

(73) Assignee: Mesa Digital, LLC, Albuquerque, NM (US)

( * ) Notice: Subject to any disclaimer, the term of this patent is extended or adjusted under 35 U.S.C. 154(b) by 149 days.

(21) Appl. No.: 13/103,227

(22) Filed: May 9, 2011

(65) Prior Publication Data

US 2012/0056809 A1    Mar. 8, 2012

Related U.S. Application Data

(60) Provisional application No. 61/379,785, filed on Sep. 3, 2010.

(51) Int. Cl.
*G06F 3/033* (2006.01)

(52) U.S. Cl.
USPC ............................................. 345/157

(58) Field of Classification Search
USPC .......................................... 345/157; D14/389
See application file for complete search history.

(56) References Cited

U.S. PATENT DOCUMENTS

| | | | |
|---|---|---|---|
| 6,304,249 B1 | 10/2001 | Derocher et al. | |
| 6,622,306 B1 * | 9/2003 | Kamada | 725/109 |
| 6,977,811 B1 | 12/2005 | Fleck et al. | |
| 7,161,578 B1 * | 1/2007 | Schneider | 345/156 |
| 7,330,177 B2 | 2/2008 | Kukita | |
| 7,710,397 B2 | 5/2010 | Krah et al. | |
| 2001/0020982 A1 | 9/2001 | Takeda et al. | |
| 2005/0116934 A1 | 6/2005 | Yin et al. | |
| 2007/0159362 A1 | 7/2007 | Shen | |

* cited by examiner

*Primary Examiner* — Quan-Zhen Wang
*Assistant Examiner* — Chad Dicke
(74) *Attorney, Agent, or Firm* — Kermit D. Lopez; Luis M. Ortiz; Ortiz & Lopez, PLLC (57) ABSTRACT

A portable pointing apparatus utilized with a computing device such as a personal computer, laptop computer, and/or an Internet connected television. The pointing apparatus generally comprises a spin ball, a right click button, a left click button, and a hold button for performing various cursor movements and cursor operations on a display of the computing device. The hold button can be utilized to highlight data displayed on the computing device. The apparatus also includes a laser pointer for pointing out important data on the display. A tracking device generates a movement signal based on a movement of the pointing apparatus. The computing device receives a movement signal from a tracking system and controls the movement of a cursor displayed via the computing device. The pointing apparatus can be operated from any convenient location and can be of any shape or form for user comfort.

20 Claims, 5 Drawing Sheets

HANDHELD PORTABLE POINTING APPARATUS

CROSS-REFERENCE TO PROVISIONAL APPLICATION

This patent application claims the benefit under 35 U.S.C. §119(e) of U.S. Provisional Application Ser. No. 61/379,785 entitled, "Handheld Portable Pointing Apparatus," which was filed on Sep. 3, 2010 and is incorporated herein by reference in its entirety.

TECHNICAL FIELD

Embodiments are generally related to input devices. Embodiments also relate to the field of pointing devices for computers. Embodiments additionally relate to a handheld portable mouse for use with a computing device such as, for example, a personal computer, a laptop computer, a television and so forth.

BACKGROUND OF THE INVENTION

A computer mouse is a common pointing device utilized to generate movement commands for controlling a cursor position displayed on a computer screen. The mouse sits to the side of the computer and resides on a flat surface, such as a mouse pad. Typically the mouse requires a substantially planar surface on which to move. A mechanical mouse, for example, includes a captured ball at an underside, which rolls along the planar surface as an operator moves the mouse. The movement of the ball generates inputs to directional sensors housed adjacent to the ball within the mouse. The directional signals are put into the computer to control the cursor movement. Another kind of mouse, an optical mouse, includes a light emitting diode or phototransistor associated with a grid providing a signal corresponding to distance and direction of mouse movement.

A computer mouse often includes one or more buttons which are either dedicated or programmed to correspond to specific command functions, (e.g., "click" to select a display icon; "double click" or open item corresponding to display icon; display a menu; drag icon to a new location on the screen; or some custom function). Other common computer pointing devices include, for example, a trackball, a touch pad, and a joystick. Each of these devices control the movement of a cursor on a computer screen and include buttons for entering specific command functions.

Conventionally, the mouse is tethered to a host computer by a cable, or another flexible or rigid linking mechanism. One undesired effect of the cable is that it restricts movement of the mouse.

Another shortcoming of the conventional mouse relates to portable computing. A large portion of the personal computer market is for portable computers such as laptop computers, notebook computers, sub-notebook computers, and hand-held or palmtop computers. The mouse is a tethered device so it is typically detached and stored in a carrying case with the portable computer. Such mouse takes up scarce space in the carrying case.

In one prior art, a portable electronic apparatus including a main body having a display unit on a surface and a protruding holding unit is disclosed. The holding unit includes a pointing device and switches that are operated by a same hand holding the unit. The pointing device includes one of a stick type pointing device and a trackball type pointing device that performs pointing operations including moving a cursor displayed on the display unit. The switches are for setting or canceling instructions given by the pointing device with click operations. The holding unit is also configured to be folded toward a side of the main body. When it is folded, an electric power supply is automatically turned off or put in a standby state and when the holding unit is unfolded to its original position, the electric power supply is either turned on or put in an operating state.

In other prior art, a computer mouse collapsible into a smaller form is disclosed. The wireless mouse is provided, including a wireless transmission medium for communicating with the host computer. Also, the mouse is adjustable between a first operable configuration and a second, reduced-volume, storage configuration.

A foldable computer mouse including a mouse body, a sensor, and an extension part is disclosed in another prior art. The bottom of the mouse body includes a receiving space and a contact surface, disposing the sensor on the contact surface of the bottom of the mouse body. The extension part is pivotally connected to one side of the mouse body and adjacent to the receiving space. When the extension part rotates outwards to a predetermined location, the contact surface between the foldable computer mouse and users is increased. Yet when the extension part rotates inwards toward the inside of the receiving space, the size of the foldable computer mouse is reduced for easy storage. When the extension part rotates outwards to the predetermined location, users can operate the foldable computer mouse, and when the extension part rotates inside the receiving space, users can operate the foldable computer mouse as well.

The prior pointing devices are either portable or hand held. Further, some of the pointing devices need a table top such as a desk for operation. In some cases the user may be in a need to operate a personal computer or an computing devices from any convenient location, for example, from a convenient location within a house. The mouse operation includes, for example, scrolling through the internet, highlighting data on the internet, and performing various click operations. Also, in some cases along with the mouse operation, the user may be in a need to point out some important data on the display. In an effort to address the foregoing difficulties, it is believed that the hand held portable pointing device, as discussed herein, can address many of the problems with traditional pointing devices.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved input apparatus.

It is another aspect of the disclosed embodiments to provide for a pointing device for use with computing devices such as computers, laptops, televisions, and so forth.

It is a further aspect of the present invention to provide for a handheld portable mouse utilized with a computing device such as an Internet connected computing device (e.g., personal computer, laptop computer, Internet connected television, etc).

The aforementioned aspects and other objectives and advantages can now be achieved as described herein. A hand held portable pointing device can be utilized with a computing device (e.g., an Internet connected device, personal computer, laptop computer, Internet connected television, etc.) for performing various operations such as, for example, scrolling through or "surfing" the Internet, selecting items, initiating financial transactions, software applications, and so forth. The pointing apparatus generally includes a spinning ball, a right click button, a left click button, and a hold button for performing various cursor movements and cursor operations on a display of the computing device. The hold button can be utilized to highlight data displayed on the computing device. The apparatus also includes a laser pointer that can be utilized for pointing out important data on the display.

A tracking device can be provided for generating a movement signal based on the movement of the pointing apparatus. The movement signal controls the movement of a cursor on computing device. The computing device can be operated from any convenient location and can be of any convenient shape or form according to the user comfort. The user can easily navigate through the internet or any computer application from any convenient location.

In general, a variety of different embodiments are disclosed. For example, in one embodiment, a pointing apparatus for a computing device can include a body comprising an upper portion and a lower portion, wherein the upper portion comprises a spin ball, a right click button and a left click button and the lower portion attached to a bottom surface of the upper portion comprises a hold button to highlight data displayed on the computing device. Such an apparatus can also include a tracking device for generating a movement signal based on a movement of the pointing apparatus, wherein a signal associated with the movement controls a movement of a cursor graphically displayed on a display of computing device; and a communications interface for transmitting the movement signal to the computing device.

In another embodiment of such an apparatus, the lower portion can comprise a laser pointer for pointing out important data displayed on the display. In another embodiment, the body can house the tracking device and the communications interface. In yet another embodiment, the communications interface can be a transmitter electronically coupled to the tracking device and an antenna coupled to the transmitter. In another embodiment, the transmitter can route the movement signal from the tracking device to the computing device via wireless communications. In still other embodiments, the computing device can be an Internet connected computer. In other embodiments, the computing device can be a television, or may be composed of a computer in communication with a television, or the television may incorporate the computer. Other examples of such a computer include, for example, a set top box for delivering Internet content and/or cable television and/or digital satellite signals to a television. In other embodiments, the pointing apparatus may be a mouse.

In yet another embodiment, a pointing apparatus for a computing device can be configured to include a body comprising: an upper portion and a lower portion, wherein the upper portion comprises a spin ball, a right click button, and a left click button; the lower portion attached to a bottom surface of the upper portion comprises a hold button to highlight data displayed on the computing device, a tracking device for generating a movement signal based on a movement of the pointing apparatus, wherein a signal associated with the movement controls a movement of a cursor graphically displayed on a display of computing device; and a communications interface for transmitting the movement signal to the computing device and wherein the lower portion further comprises a laser pointer for pointing out important data displayed on the display.

In still another embodiment, a pointing apparatus for a computing device can be configured to include a body comprising an upper portion and a lower portion, wherein the upper portion comprises a spin ball, a right click button, and a left click button; the lower portion attached to a bottom surface of the upper portion comprises a hold button to highlight data displayed on the computing device, a tracking device for generating a movement signal based on a movement of the pointing apparatus, wherein a signal associated with the movement controls a movement of a cursor graphically displayed on a display of computing device; and a communications interface for transmitting the movement signal to the computing device and wherein the body houses the tracking device and the communications interface.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof. Note that in FIGS. 1-5, identical or similar parts or elements are generally indicated by identical reference numerals.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one skilled in the art, the present invention can be embodied as a method, data processing system, or computer program product. Accordingly, the present invention may take the form of an entire hardware embodiment, an entire software embodiment, or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages such as the "C" programming language or in a visually oriented programming environment such as, for example, VisualBasic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), or the connection may be made to an external computer (for example, through the Internet using an Internet Service Provider).

The invention is described in part below with reference to flowchart illustrations and/or block diagrams of methods, systems, computer program products, and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
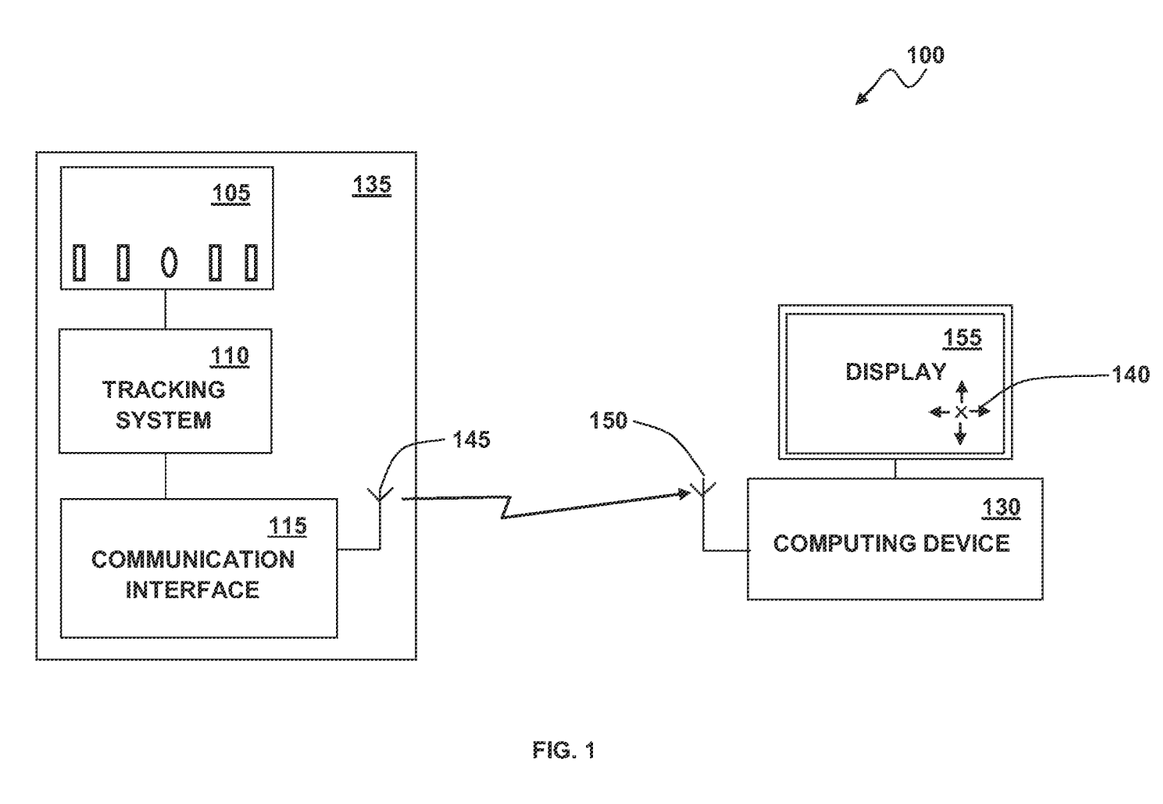
FIG. 1 illustrates a simplified block diagram of a hand held portable pointing apparatus coupled to a computing device by a wireless transmission medium, in accordance with the disclosed embodiments.

FIG. 1 illustrates a simplified block diagram of a system 100 that includes a hand held portable pointing apparatus 135 coupled to a computing device 130 by a wireless transmission medium, in accordance with the disclosed embodiments. The pointing apparatus 135 can be utilized with the computing device 130 to control the movement of a cursor 140 or other reference displayed on a display screen 155 of computing device 130. The pointing apparatus 135 includes a tracking system 110, buttons 105, and a communication interface 115. The communication interface 115, for example, includes a transceiver or a transmitter (not shown) and an antenna 145. The movement signals generated by the tracking system 110 and buttons 105 are sent to the computing device 130 through the communication interface 115 using a prescribed protocol. The computing device 130 receives movement signals from the tracking system 110 through an antenna 150 and controls the movement of cursor 140 graphically displayed on the display screen 155 associated with the computing device 130.

The tracking system 110, for example, can be an optical system which measures the movement and operation of the buttons 105 and determines the direction and magnitude of the movement. The direction and magnitude of movement can be transmitted to the computing device 130 to perform various operations on display screen 155.

Figure 2:
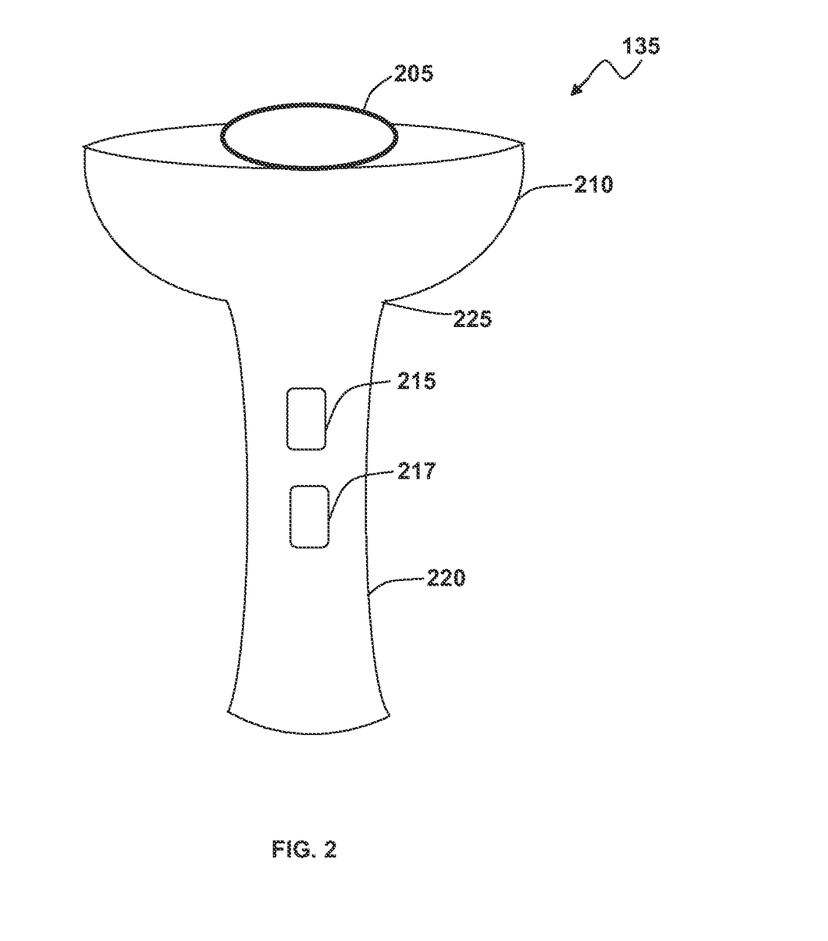
FIG. 2 illustrates a perspective front view of a hand held portable pointing apparatus, in accordance with the disclosed embodiments.
Figure 3:
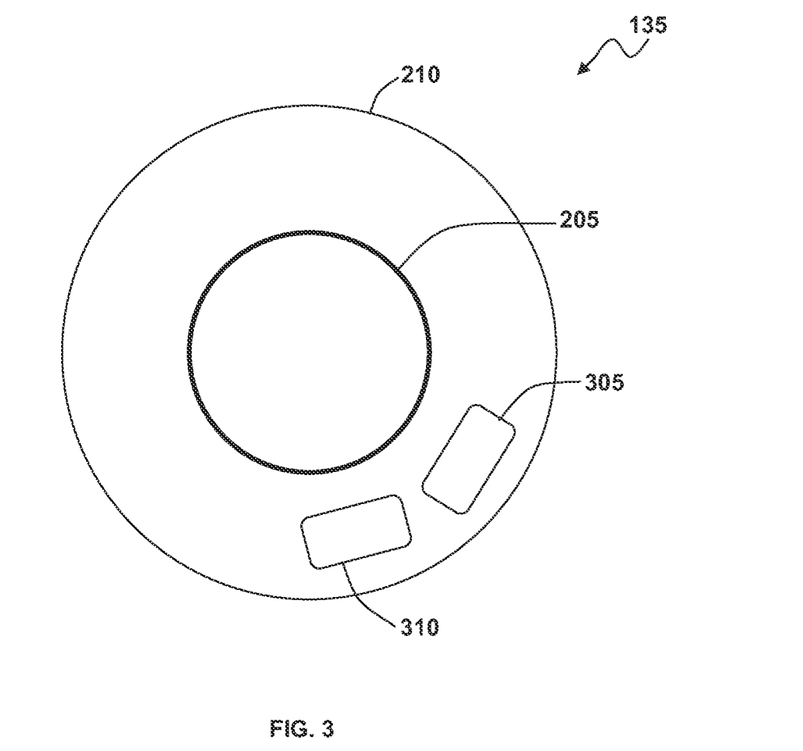
FIG. 3 illustrates a top view of the hand held portable pointing apparatus of FIG. 2, in accordance with the disclosed embodiments.

FIG. 2 illustrates a perspective front view of the hand held portable pointing apparatus 135 of FIG. 1, in accordance with the disclosed embodiments. The pointing apparatus 135 can be configured to include an upper portion 210 and a lower portion 220. The upper portion 210 and the lower portion 220 together comprise a grail shaped overall body of the pointing apparatus 135. FIG. 3 illustrates a top view of the portable device 135 depicted in FIG. 2, in accordance with the disclosed embodiments. The upper portion 210 includes a spin ball 205, a right click button 305, and a left click button 310. The lower portion 220 can be attached to a bottom surface 225 of the upper portion 210. The lower portion 220 can be configured to include a hold button 215 to highlight data displayed on the display screen 155 of computing device 130. By operating the spin ball 205, the user can rapidly move the cursor 140 across the whole display screen 155 if desired.

The lower portion 220 also includes a laser pointer 217 for pointing out important data displayed on the display screen 155, by projecting a small bright spot of colored laser light. For example, a professor or any professional teaching a subject in a class or giving a speech with a presentation on a slide show or an internet can point out important material displayed on the display screen 155 to the students by utilizing the laser pointer 217. The laser pointer 217 is an independent device which in no way controls the cursor movement on the display. For example, whenever a user of the pointing apparatus is in a need to point out some data on the display he or she can operate the laser pointer 217.

The spin ball 205, the hold button 215, the right click button 305, and the left click button 310 can be operated individually or together to perform various operations on the display 155. The operations may include, for example, "click", "double click", drag icon to a new location, scrolling through the internet, highlighting data, and other custom functions.

Figure 4:
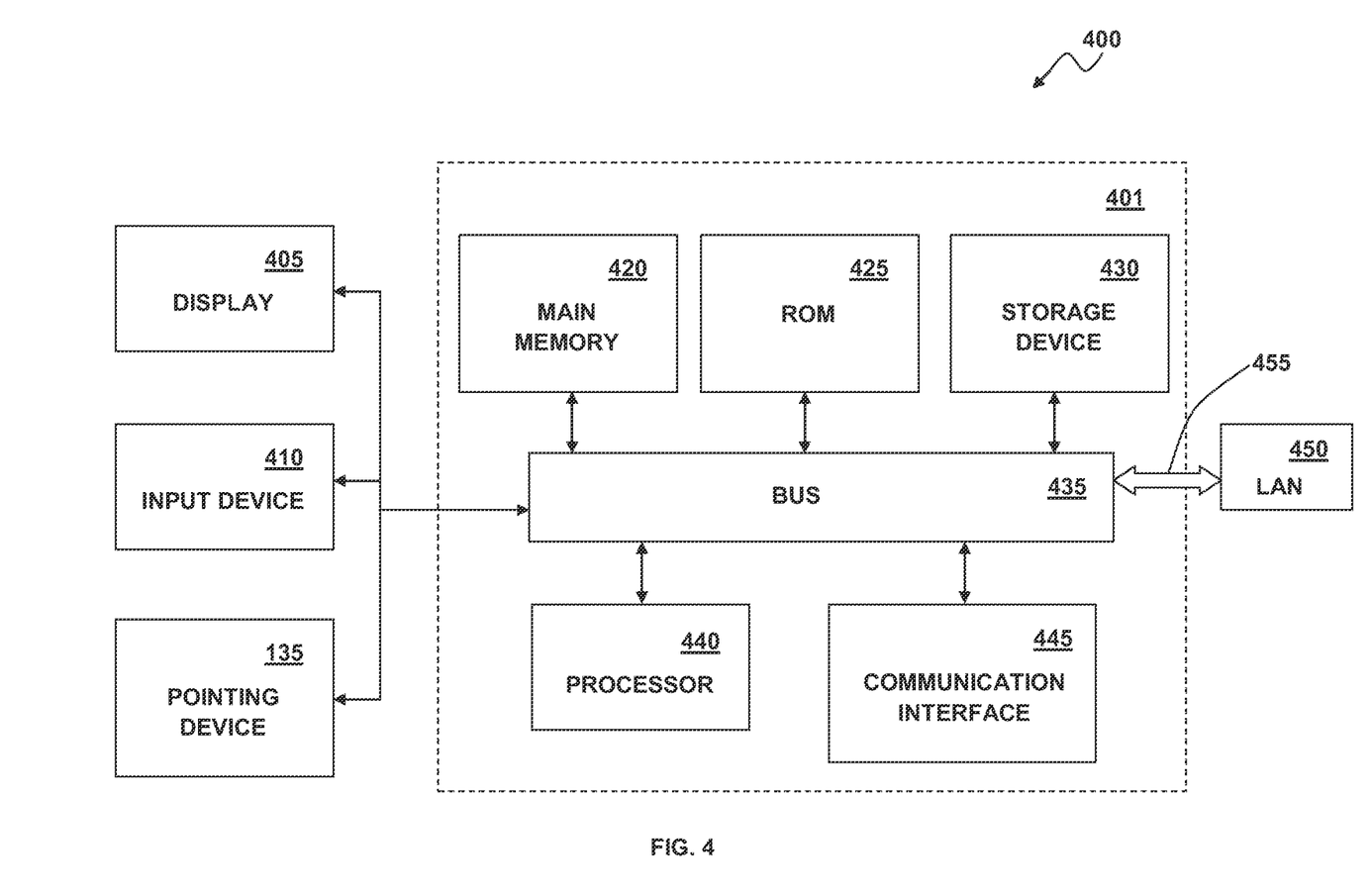
FIG. 4 illustrates a schematic block diagram of an internet connected personal computer utilizing the hand held portable pointing apparatus of FIG. 2 as a mouse, in accordance with the disclosed embodiments.

FIG. 4 illustrates a schematic block diagram of a system 400 comprising an internet connected personal computer 401 utilizing the hand held portable pointing apparatus 135 depicted in FIG. 2 as a mouse, in accordance with the disclosed embodiments. The personal computer 401 includes a bus 435 or other communication mechanism for communicating information and a processor 440 coupled to the bus 435 for processing information. The computer system 401 also includes a main memory 420, such as a random access memory (RAM) or other dynamic storage device, coupled to the bus 435 for storing information and instructions to be executed by the processor 440. Main memory 420 can also be used for storing temporary variables or other intermediate information during execution of instructions by the processor 440. The computer system 401 may further include a read only memory (ROM) 425 or other static storage device coupled to the bus 435 for storing static information and instructions for the processor 440. A storage device 430, such as a magnetic disk or optical disk, is coupled to the bus 435 for persistently storing information and instructions.

The computer 401 may be coupled through the bus 435 to a display 405, such as a Cathode Ray Tube (CRT), Liquid Crystal Display (LCD), active matrix display, or plasma display, for displaying information to a computer user. An input device 410, such as a keyboard including alphanumeric and other keys, is coupled to the bus 435 for communicating information and command selections to the processor 440. Another type of user input device can be the pointing apparatus 135 depicted in FIG. 2 for communicating direction information and command selections to the processor 440 and for controlling cursor movement on the display 405.

The computer system 401 also includes a communication interface 445 coupled to the bus 435. The communication interface 445 provides a two-way data communication coupling to a network link 455 connected to a local Area Network (LAN) 450. For example, the communication interface 445 may be a digital subscriber line (DSL) card or modem, an integrated services digital network (ISDN) card, a cable modem, a telephone modem, or any other communication interface to provide a data communication connection to a corresponding type of communication line. As another example, communication interface 445 may be a local area network (LAN) card (e.g. for Ethernet™ or an Asynchronous Transfer Model (ATM) network) to provide a data communication connection to a compatible LAN. Wireless links can also be implemented. In any such implementation, communication interface 445 sends and receives electrical, electromagnetic, or optical signals that carry digital data streams representing various types of information. Further, the communication interface 445 can include peripheral interface devices such as a Universal Serial Bus (USB) interface, a PCMCIA (Personal Computer Memory Card International Association) interface, etc. Although a single communication interface 445 is depicted in FIG. 4, multiple communication interfaces can also be employed.

Figure 5:
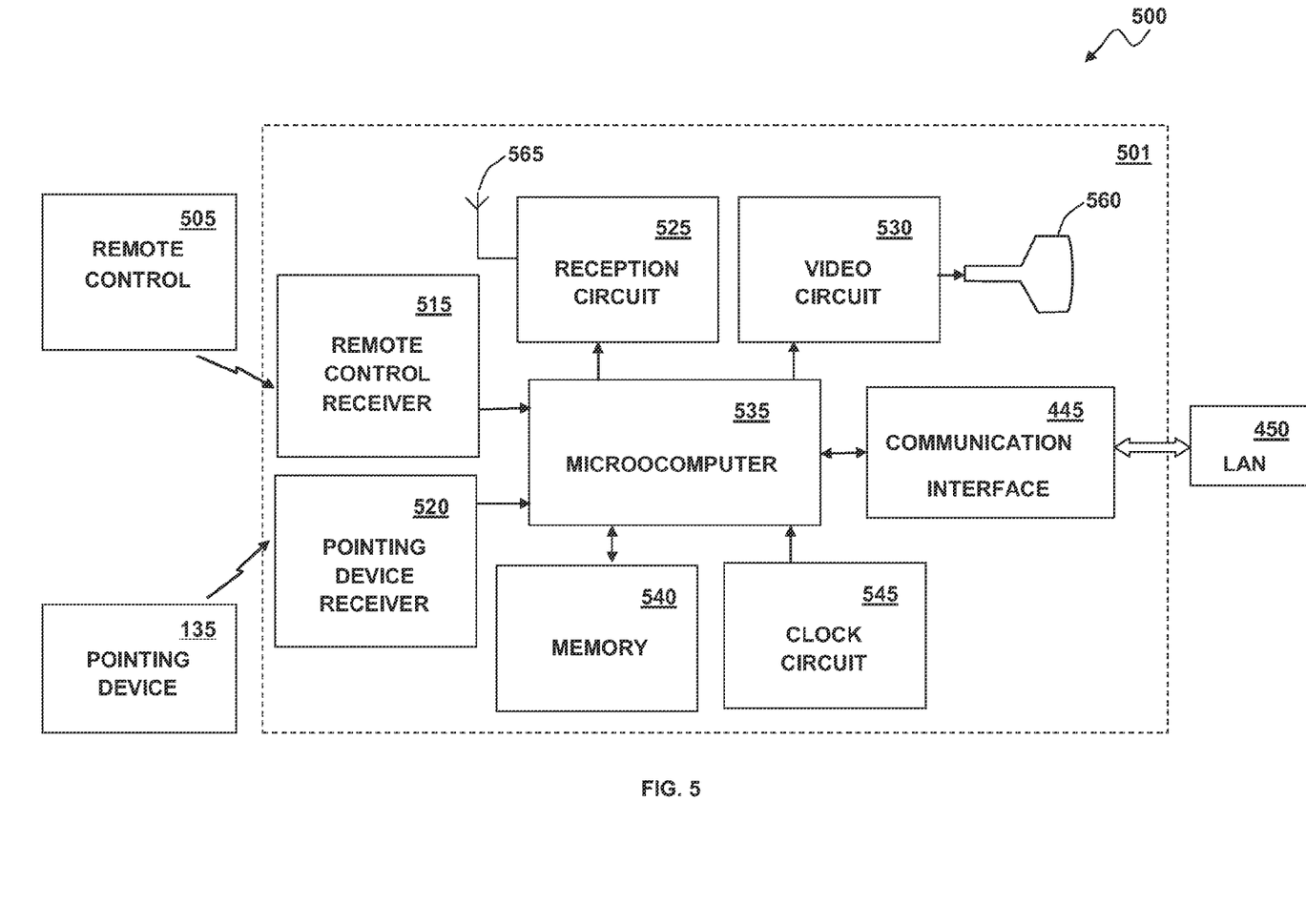
FIG. 5 illustrates a schematic block diagram of an internet connected television device utilizing the hand held portable pointing apparatus of FIG. 2 as a mouse, in accordance with an alternate embodiment.

FIG. 5 illustrates a schematic block diagram of a system 500 of an Internet connected television device 501 utilizing the pointing apparatus 135 depicted in FIG. 2 as a mouse, in accordance with an alternate embodiment. An antenna 565 receives the television broadcast radio waves and forwards it to a reception circuit 525. A remote control receiver 515 selects a desired channel and acquires color video signals of the selected channel through demodulation. The color video signals are fed to a video circuit 530. In turn, the video circuit 530 obtains through demodulation color video signals for display. The video signals are supplied to a display unit such as a color CRT 560 which displays images of the selected channel. The television device 501 includes a microcomputer 535 for system control purposes. Although not shown, the microcomputer 535 has a CPU that executes programs, a ROM that stores various programs, a work area RAM, and ports connected to peripheral circuits and devices.

The microcomputer 535 is connected to a remote control receiver 515 for receiving infrared signals from the television remote controller 505 for changing channels. The microcomputer 535 is also connected to the pointing apparatus 135 depicted in FIG. 2 through a pointing apparatus receiver 520 for controlling cursor movement on the CRT 560. The pointing apparatus receiver 520 receives cursor movement signals from the pointing apparatus 135. The microcomputer 535 is also connected to a nonvolatile memory such as a flash memory 540 for storing message and schedule data, as well as to a clock circuit 545 for counting the current time. In addition, the microcomputer 535 is connected to a communication interface 445 and LAN 450 as depicted in FIG. 4 which establishes internet connection. The user can scroll through the internet, highlight or select data, and perform mouse operations on the internet using the pointed device 135 from any convenient location like the television remote controller 505.

Based on the foregoing, it can be appreciated that a variety of different embodiments are disclosed. For example, in one embodiment, a pointing apparatus for a computing device can include a body comprising an upper portion and a lower portion, wherein the upper portion comprises a spin ball, a right click button, and a left click button, and the lower portion attached to a bottom surface of the upper portion comprises a hold button to highlight data displayed on the computing device. Such an apparatus can also include a tracking device for generating a movement signal based on a movement of the pointing apparatus, wherein a signal associated with the movement controls a movement of a cursor graphically displayed on a display of computing device; and a communications interface for transmitting the movement signal to the computing device.

In another embodiment of such an apparatus, the lower portion can comprise a laser pointer for pointing out important data displayed on the display. In another embodiment, the body can house the tracking device and the communications interface. In yet another embodiment, the communications interface can be a transmitter electronically coupled to the tracking device and an antenna coupled to the transmitter. In another embodiment, the transmitter can route the movement signal from the tracking device to the computing device via wireless communications. In still other embodiments, the computing device can be an Internet connected computer. In other embodiments, the computing device can be a television, or may be composed of a computer in communication with a television, or the television may incorporate the computer. Other examples of such a computer include, for example, a set top box for delivering Internet content and/or cable television and/or digital satellite signals to a television. In other embodiments, the pointing apparatus may be a mouse.

In yet another embodiment, a pointing apparatus for a computing device can be configured to include a body comprising an upper portion and a lower portion, wherein the upper portion comprises a spin ball, a right click button, and a left click button, and the lower portion attached to a bottom surface of the upper portion comprises a hold button to highlight data displayed on the computing device; a tracking device for generating a movement signal based on a movement of the pointing apparatus, wherein a signal associated with the movement controls a movement of a cursor graphically displayed on a display of computing device; and a communications interface for transmitting the movement signal to the computing device and wherein the lower portion further comprises a laser pointer for pointing out important data displayed on the display.

In still another embodiment, a pointing apparatus for a computing device can be configured to include a body comprising an upper portion and a lower portion, wherein the upper portion comprises a spin ball, a right click button, and a left click button, and the lower portion attached to a bottom surface of the upper portion comprises a hod button to highlight data displayed on the computing device; a tracking device for generating a movement signal based on a movement of the pointing apparatus, wherein a signal associated with the movement controls a movement of a cursor graphically displayed on a display of the computing device; and a communications interface for transmitting the movement signal to the computing device and wherein the body houses the tracking device and the communications interface.

It will be appreciated that variations of the above disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A pointing apparatus for a computing device, said apparatus comprising:
    a chalice-shaped body comprising an upper portion and a lower portion, wherein said upper portion includes an arc-shaped contour that juts away from said lower portion to form a circular rest with a diameter larger than a diameter of saw lower portion and which maintains and comprises a spin ball, a right click button and a left click button atop said circular rest and wherein said lower portion is attached to a bottom surface of said upper portion, said lower portion comprising a hold button to highlight data displayed on a display associated with said computing device;
    a tracking device for generating a movement signal based on a movement of said pointing apparatus, wherein a signal associated with said movement controls a movement of a cursor graphically displayed on a display of computing device; and
    a communications interface for transmitting said movement signal to said computing device.

2. The apparatus of claim 1 wherein said lower portion further comprises a laser pointer for pointing out important data displayed on said display.

3. The apparatus of claim 1 wherein said body houses said tracking device and said communications interface.

4. The apparatus of claim 3 wherein the said transmitter routes said movement signal from said tracking device to said computing device via wireless communications.

5. The apparatus of claim 1 wherein said communications interface comprises a transmitter electronically coupled to said tracking device and an antenna coupled to said transmitter.

6. The apparatus of claim 1 wherein said computing device comprises an Internet connected computer.

7. The apparatus of claim 1 wherein said computing device comprises a television.

8. The apparatus of claim 1 wherein said pointing apparatus comprises a mouse.

9. The apparatus of claim 1 wherein said computing device comprises a computer in communication with a television.

10. A pointing apparatus for a computing device, said apparatus comprising:
    a chalice-shaped body comprising an upper portion and a lower portion, wherein said upper portion includes an arc-shaped contour that juts away from said lower portion to form a circular rest with a diameter larger than a diameter of saw lower portion and which maintains and comprises a spin ball, a right click button and a left click button atop said circular rest and wherein said lower portion is attached to a bottom surface of said upper portion, said lower portion comprising a hold button to highlight data displayed on a display associated with said computing device;
    a tracking device for generating a movement signal based on a movement of said pointing apparatus, wherein a signal associated with said movement controls a movement of a cursor graphically displayed on a display of computing device; and
    a communications interface for transmitting said movement signal to said computing device and wherein said lower portion further comprises a laser pointer for pointing out important data displayed on said display.

11. The apparatus of claim 10 wherein said body houses said tracking device and said communications interface.

12. The apparatus of claim 10 wherein said communications interface comprises a transmitter electronically coupled to said tracking device and an antenna coupled to said transmitter.

13. The apparatus of claim 12 wherein the said transmitter routes said movement signal from said tracking device to said computing device via wireless communications.

14. The apparatus of claim 10 wherein said computing device comprises an Internet connected computer.

15. The apparatus of claim 10 wherein said computing device comprises a television.

16. A pointing apparatus for a computing device, said apparatus comprising:
    a chalice-shaped body comprising an upper portion and a lower portion, wherein said upper portion includes an arc-shaped contour that juts away from said lower portion to form a circular rest with a diameter larger than a diameter of saw lower portion and which maintains and comprises a spin ball, a right click button and a left click button atop said circular rest and wherein said lower portion is attached to a bottom surface of said upper portion, said lower portion comprising a hold button to highlight data displayed on a display associated with said computing device;
    a tracking device for generating a movement signal based on a movement of said pointing apparatus, wherein a signal associated with said movement controls a movement of a cursor graphically displayed on a display of computing device; and
    a communications interface for transmitting said movement signal to said computing device and wherein said body houses said tracking device and said communications interface.

17. The apparatus of claim 16 wherein said lower portion further comprises a laser pointer for pointing out important data displayed on said display.

18. The apparatus of claim 16 wherein said communications interface comprises a transmitter electronically coupled to said tracking device and an antenna coupled to said transmitter and wherein the said transmitter routes said movement signal from said tracking device to said computing device via wireless communications.

19. The apparatus of claim 18 wherein said computing device comprises an Internet connected computer.

20. The apparatus of claim 18 wherein said computing device comprises a television.

\* \* \* \* \*

UNITED STATES PATENT AND TRADEMARK OFFICE
CERTIFICATE OF CORRECTION

PATENT NO. : 8,525,781 B2
APPLICATION NO. : 13/103227
DATED : September 3, 2013
INVENTOR(S) : Jim Ray Marentes Aguilar Page 1 of 1

It is certified that error appears in the above-identified patent and that said Letters Patent is hereby corrected as shown below:

In the Claims:

1) Column 9, Claim 1, line 34, please delete "saw" and insert therefore --said--;

2) Column 10, Claim 10, line 7, please delete "saw" and insert therefore --said--;

3) Column 10, Claim 16, line 43, please delete "saw" and insert therefore --said--.

Signed and Sealed this
Eighth Day of October, 2013

Teresa Stanek Rea
*Deputy Director of the United States Patent and Trademark Office*